United States Patent
Gaman

[11] Patent Number: 5,954,261
[45] Date of Patent: Sep. 21, 1999

[54] WELDING MOLD AND METHOD

[75] Inventor: Nicolae Gaman, Nuenen, Netherlands

[73] Assignee: Erico International Corporation, Solon, Ohio

[21] Appl. No.: 08/835,304

[22] Filed: Apr. 7, 1997

Related U.S. Application Data

[60] Provisional application No. 60/015,817, Apr. 18, 1996.

[51] Int. Cl.[6] .................................................. B23K 23/00
[52] U.S. Cl. ............................ 228/33; 228/44.3; 228/50; 249/108; 249/95; 249/97; 266/167
[58] Field of Search ............................. 228/33, 44.3, 50; 249/90, 95–98, 108; 266/167; 164/54, 334, DIG. 12; 425/108, 123

[56] References Cited

U.S. PATENT DOCUMENTS

| | | | |
|---|---|---|---|
| 2,957,214 | 10/1960 | Kuharski | 70/118 |
| 3,020,608 | 2/1962 | Gefland | 249/61 |
| 3,234,603 | 2/1966 | Leuthy et al. | 249/108 |
| 3,255,498 | 6/1966 | Leuthy et al. | 249/108 |
| 3,274,650 | 9/1966 | Gelfand | 249/90 |
| 3,554,270 | 1/1971 | Gelfand | 249/90 |
| 3,782,677 | 1/1974 | Gelfand | 249/97 |
| 3,803,703 | 4/1974 | Montgomery | 228/50 |
| 3,860,062 | 1/1975 | McMurray et al. | 249/78 |
| 5,292,057 | 3/1994 | Lomastro | 228/234.3 |
| 5,533,662 | 7/1996 | Stidham et al. | 228/33 |
| 5,715,886 | 2/1998 | Fuchs | 249/97 |

*Primary Examiner*—Samuel M. Heinrich
*Attorney, Agent, or Firm*—Renner, Otto, Boisselle, & Sklar P.L.L.

[57] ABSTRACT

A mold for joining conductors such as stranded cable to each other and to other elements such as a ground rod is formed of two or more parts. The mold formed by the parts includes a weld chamber. Exothermic welding material in a crucible above forms molten metal which drops into the weld chamber through a tap hole. The mold includes sleeving passages extending upwardly at an angle from horizontal to exit the mold well above the level of molten metal forming the weld. The sleeving passages extending upwardly at an angle from the weld chamber, or as a V with two symmetrical passages, are preferably larger than normal passages and accordingly will accommodate a wide variety of cable sizes without interference with or abrasion of the sleeving passages. This enables one mold to accommodate more sizes, avoids the use of packing, adapter sleeves or shims, and maintains the weld chamber well vented. For a two, three or more cable connection, the mold system results in a two, three or more dimension V connection, joined at the crotch by the weld metal.

9 Claims, 2 Drawing Sheets

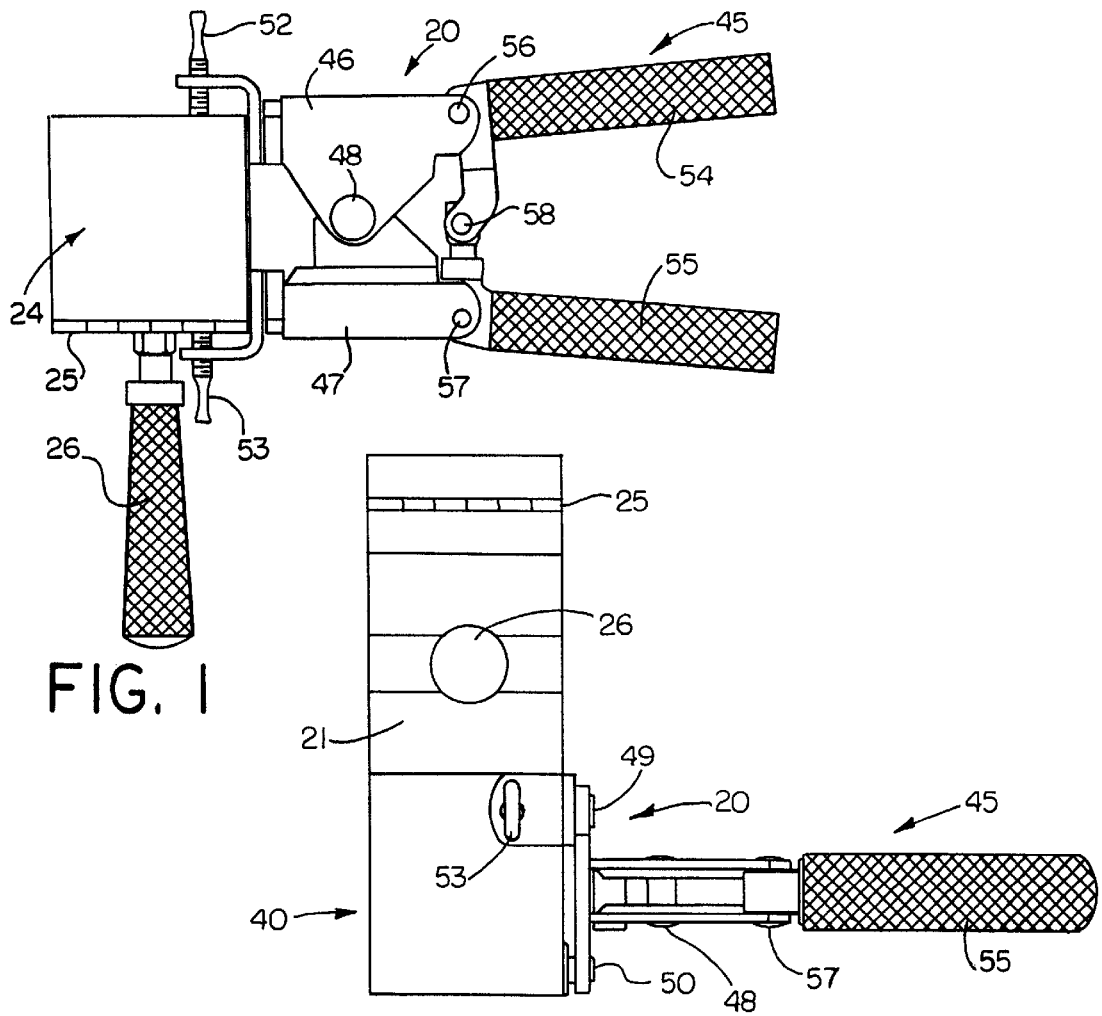

WELDING MOLD AND METHOD

This application is a Continuation of Provisional Application Ser. No. 60/015,817 filed Apr. 18, 1996.

DISCLOSURE

This invention relates generally as indicated to a welding mold and method, and more particularly, to a reusable refractory mold and method for making electrical exothermic weld connections.

BACKGROUND OF THE INVENTION

Reusable refractory molds usually made of graphite or the like are widely used with exothermic welding materials to make a wide variety of high ampacity low resistance electrical connections. Typical of such molds are those sold under the well-known trademark CADWELD® by ERICO International of Solon, Ohio USA.

Such reusable molds are two or more part molds usually opened and closed and held together by toggle clamps. The mold parts have faces which abut at a parting plane in which are formed recesses forming the various cavities and passages when the parts are clamped together. Typically the mold parts form a weld chamber, which usually includes a riser which may be the enlarged lower end of a tap hole passage which extends from the top of the mold to the weld chamber. The parts to be welded enter the weld chamber through sleeving passages which extend from outside the mold to the weld chamber. Such passages usually extend horizontally or from the bottom. Horizontal passages are typically employed when welding cable-to-cable. They may be used in combination with a vertical passage when welding cable to an earthing rod, for example.

A crucible normally sits on top of the assembled mold parts. The crucible includes a chamber holding the exothermic material on top of a fusible disc. A sprue or tap hole below the disc communicates with the top of the tap hole of the mold. When a measured and controlled quantity of exothermic material is ignited, it forms molten metal which fuses the disc permitting the molten metal to run downwardly into the weld chamber to weld any parts exposed to the chamber. Any slag forms on top of the weld metal and normally accumulates in the riser. After the weld cools, the mold is disassembled and any slag removed. The mold and crucible are cleaned for reuse.

Such molds can be rather intricate and are not insignificant in cost. The number of times a mold can be reused has a very direct impact on the cost of each weld connection. It has been found that the greatest wear on such molds occurs at the sleeving passages. This is particularly true where the sleeving passages accommodate stranded cable which may vary in size. With such cable, sealing material or packing must normally be employed to prevent the molten metal from leaking. Where the conductor is undersize the mold sleeving passage, adapter sleeves or shims around the conductors may be employed to fit the sleeving passage, and such may be used in combination with the packing material. All of the above adds to the cost of the weld.

Although it is always recommended to preheat the mold before use to ensure no moisture comes in contact with the molten metal, it can be seen that this is less of a problem if the weld chamber is not sealed, but well vented, especially along the sleeving passages.

For most connections, it is a time consuming job to locate the cable ends properly in the weld chamber beneath the tap hole, all properly sleeved, shimmed or sealed. Cable of considerable length and size is bulky and difficult to handle and keep in one place. This is particularly true where the operator is trying to close the mold parts properly on three cables or two cables and a ground rod, for example. Sometimes special cable clamps must be used. It would be very convenient if the operator could insert the cable ends into an already closed mold, and to a physical stop. It would also be convenient to have a mold system where the cable ends would stay where positioned as the operator proceeds with the welding operation. It can be seen that it would be highly advantageous to provide a mold system for electrical or earthing connections and the like which would readily accommodate different size cabling without the use of packing, adapter sleeves or shims and with minimal wear on the sleeving passages. It would also be desirable for the mold systems to maintain the weld chamber well vented to atmosphere.

SUMMARY OF THE INVENTION

A mold for joining conductors such as stranded cable to each other and to other elements such as a ground rod is formed of two or more parts. The mold formed by the parts includes a weld chamber. Exothermic welding material in a crucible above forms molten metal which drops into the weld chamber through a tap hole. The mold includes sleeving passages extending upwardly at an angle from horizontal to exit the mold well above the level of molten metal forming the weld. In this manner, the molten metal is contained within the weld cavity of the mold.

The sleeving passages extending upwardly at an angle from the weld chamber, or as a V with two symmetrical passages, are preferably larger than normal passages and accordingly will accommodate a wide variety of cable sizes without interference with or abrasion of the sleeving passages. This enables one mold to accommodate more sizes, avoids the use of packing, adapter sleeves or shims, and maintains the weld chamber well vented. For a two, three or more cable connection, the mold system results in a two, three or more dimension V connection, joined at the crotch by the weld metal.

The installation and operation of the parts are greatly simplified. The mold is closed before the cable ends are inserted in the V-shape sleeving passages. The ends are simply inserted in the sleeving passages until they abut the weld chamber or other cable inserted from another sleeving passage. The cables may be bent a short distance from their ends, and in effect hooked into the inclined sleeving passages. This holds the cable in place while the operator may assemble the crucible, charge it with exothermic welding material, and ignite such material, to form the molten metal for welding.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a top plan view of a mold assembly and crucible for forming electrical connections;

FIG. 2 is a side elevation of the assembly as seen from the bottom of FIG. 1;

FIG. 3 is an elevation as seen from the left hand side of FIG. 2;

FIG. 4 is a vertical section seen from the line 4—4 of FIG. 3;

DETAILED DESCRIPTION OF THE PREFERRED EMBODIMENTS

Figure 5:
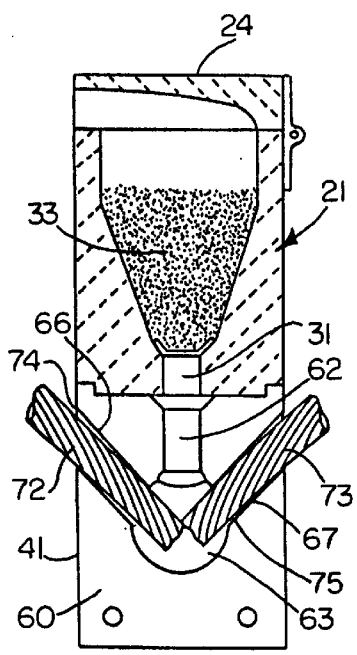
FIG. 5 is a similar section with two cables in place.

Referring now to the drawings, and initially to FIGS. 1–4, there is illustrated generally at 20 apparatus for forming an electrical connection in accordance with the present invention. The apparatus comprises a refractory crucible 21 formed of a refractory material such as graphite and containing a reaction chamber 22 open at the top as indicated at 23 in FIG. 4, beneath a refractory lid 24 hinged to the top of the crucible as indicated at 25. The crucible includes a projecting handle 26.

As seen more clearly in FIG. 4, the reaction chamber 22 funnels to a shoulder 30 and a bottom tap hole 31. In operation a steel disc 32 sits on the shoulder 30 containing the charge of exothermic material 33. A starting powder may be sprinkled over the top of the charge 33 as indicated at 34. Some of the starting powder may be placed on the rim 35 so that the reaction may be initiated by an igniter through the opening formed by the arched roof 36 of the lid 24.

The bottom of crucible 21 is seated on top of a mold assembly shown generally at 40 which may comprise two substantially identical refractory blocks 41 and 42 which are clamped together at a common parting plane seen at 43.

The blocks are clamped together or opened and closed by a toggle clamp shown generally at 45. The toggle clamp includes two frames 46 and 47 seen in FIG. 1 pivoted together as indicated at 48. Each frame is removably secured to respective blocks 41 and 42 by the projecting pins seen at 49 and 50 in FIG. 2 which project into the blocks. The frames are held locked in place by the thumb screws 52 and 53. Each toggle frame includes a handle indicated at 54 and 55 pivoted to the respective frames at 56 and 57. Each handle includes a right angle adjustable toggle linkage pivoted to each other at 58. When the pivot 58 is over— center or to the left of the line between the pivots 56 and 57, the two mold blocks 41 and 42 are clamped together at the parting plane 43. When the pivot 58 moves to the right of the line between the pivots 56 and 57, the mold block parts hinge open or away from each other about the pivot 48 as the handles are separated.

Referring now to FIG. 4, it will be seen that the face of each block at the common parting plane 43 shown at 60 for the block 41 includes a number of recesses which form certain passages and chambers when the blocks are clamped together. The exposed mold face will be described as though the recesses were formed since the opposite mold face is essentially identical.

The tap hole 31 of the crucible communicates with a tap hole 62 in the mold assembly which leads to an enlarged central weld chamber 63. The tap hole may be slightly enlarged as indicated at 64 as it enters the weld chamber to form a riser. The riser 64 may be used to collect any slag on top of the molten metal which may be removed after the weld is made. Also entering the weld chamber are two inclined or V-shaped sleeving passages seen at 66 and 67. The sleeving passages extend upwardly at an angle to the horizontal of approximately 45° and the lower edge of each sleeving passage as it exits the mold assembly to atmosphere indicated at 68 is well above the weld chamber. A horizontal projection through the opening for such sleeving passages seen at 70 in FIG. 3 does not reveal the weld chamber.

The inclined symmetrical sleeving passages 66 and 67 are intentionally oversized for the cable ends to be received into the welding chamber. For example, the sleeving passages illustrated will accommodate cable from about 16 to about 50 square millimeters. In FIG. 5 there is illustrated two of the larger cable ends 72 and 73 inserted into the weld chamber 63. It can be seen that the cable ends are inserted to a physical stop and no great care need be taken to ensure that the cable ends are centered or symmetrical. Even with the larger cable, substantial clearance is provided between the cable and the passage as seen at 74 and 75.

Figure 6:
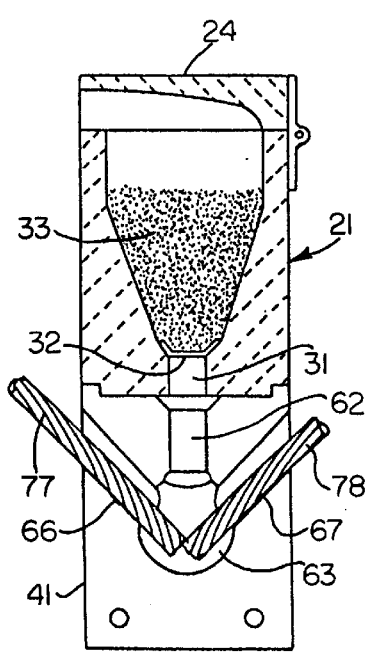
FIG. 6 is a similar view with two smaller cables.

In FIG. 6 two smaller cables seen at 77 and 78 have been introduced into the sleeving passages and the significant clearance is apparent.

Figure 7:
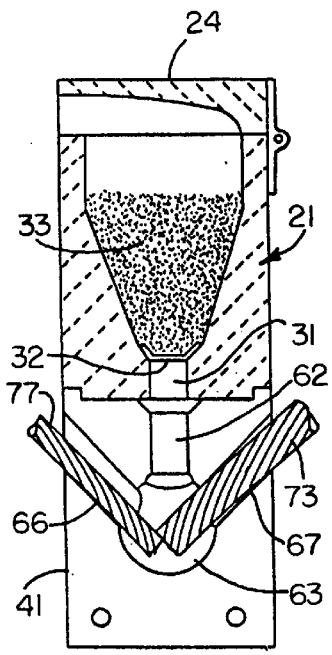
FIG. 7 is a similar view with one smaller and one large cable.

FIG. 7 illustrates a smaller cable 77 introduced in passage 66 and a larger cable 73 introduced in passage 67. What is of course to be noted is that none of the cables have been provided with sleeving, shims, or packing. Moreover, the cable ends have simply been inserted into the sleeving passages until they contact a physical stop, such as the weld chamber or the other cable end.

Figure 8:
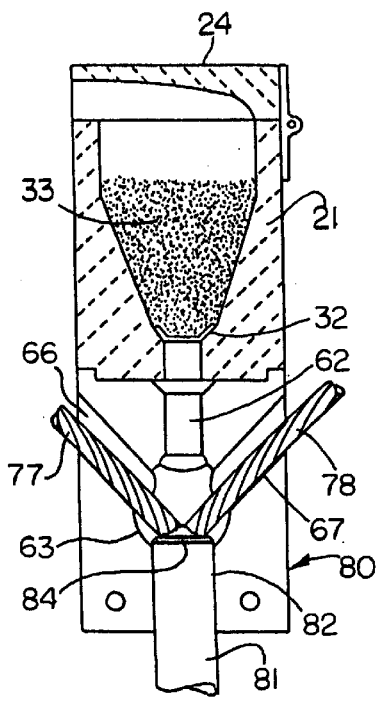
FIG. 8 is a similar view of a mold system for welding two cables on top of a ground rod, for example.

FIG. 8 illustrates a mold assembly shown generally at 80 which permits two cables 77 and 78 to be welded to the top of a grounding or earthing rod 81. The mold assembly is provided with the tap hole 62, the weld chamber 63, and the inclined sleeving passages 66 and 67. However, the mold is also provided with a vertically extending passage 82 entering the weld chamber from the bottom. When the mold parts are closed on the top of the ground rod 81, the top 84 of such rod is exposed to the weld chamber 63 and in fact forms the bottom of such chamber. Thus molten metal entering the chamber will not only weld the two cables to each other, but both cables to the top of the rod.

Figure 9:
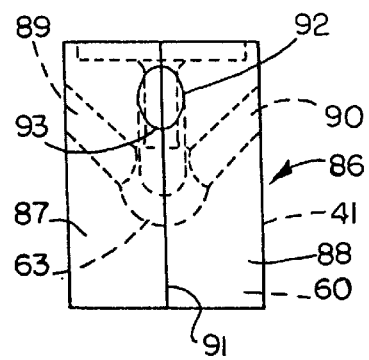
FIG. 9 is an elevation of a three or four part mold system.

As shown in FIG. 9, three cables can be welded to each other forming a three dimensional V by a three part mold assembly. The assembly shown generally in FIG. 9 at 86 includes the mold half such as seen at 41 in FIGS. 5–7 behind two quarter mold parts 87 and 88. The quarter mold parts join the mold part 41 at the face 60 forming the sleeving passages 89 and 90 and they also join each other at the parting plane 91 forming the third sleeving passage 92. The third sleeving passage 92, like the others, is inclined to horizontal and the lower edge of the opening to atmosphere seen at 93 is well above the welding chamber. Similarly, four cables can be connected with four mold parts. The mold parts may be held together by toggle clamps or other types of clamps.

To form the weld connections in each instance, the reaction material 33 will be ignited. The reaction produces molten metal which fuses the disc 32 permitting the molten metal to drop into the weld chamber providing a high ampacity, low resistance electrical connection. Such connections are typical of the connections made with earthing or grounding applications.

Figure 10:
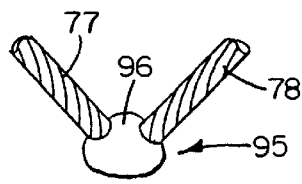
FIG. 10 is fragmentary view of the connection made.

In any event, the V-shape connection formed by the apparatus and process of the present invention is shown generally at 95 in FIG. 10. The connection includes the weld metal 96 forming a fused and molecular connection between the cables 77 and 78.

The present invention permits the use of longer lived molds since the sleeving or shims normally employed would abrade the sleeving passages of the graphite molds. With the present invention, high ampacity, low resistance electrical connections can quickly be made without the use of shims, sleeving or packing, and the weld chamber is left vented to atmosphere. Moreover, the cable ends are more easily inserted to a positive physical stop. The connections made are high quality electrical connections made more efficiently and economically with fewer parts.

To the accomplishment of the foregoing and related ends, the invention then comprises the features hereinafter fully described and particularly pointed out in the claims.

I claim:

1. A mold for joining cable comprising a refractory block having a recess forming a weld chamber, a tap hole for introducing weld metal into the recess, and at least one inclined sleeving passage communicating with the weld chamber for introducing a part to be joined into the weld chamber, characterized by the sleeving passage extending at an inclined angle to horizontal so that its upper end as it exits the mold assembly is entirely above the weld chamber.

2. A mold as set forth in claim 1 including at least two inclined sleeving passages communicating with the weld chamber, and two separate parts forming said mold, said parts having a parting plane extending through said inclined sleeving passages.

3. A mold as set forth in claim 2 including a clamp to hold said parts together at said parting plane to form said mold and said passages.

4. A mold as set forth in claim 3 including a crucible on top of said mold operative to hold exothermic material which when ignited will flow through the tap hole into said weld chamber.

5. A mold as set forth in claim 2 including at least three inclined sleeving passages communicating with the weld chamber, and three parts forming said mold, each having a parting plane extending coaxially with one or more inclined sleeving passages.

6. A mold as set forth in claim 1 wherein said at least one inclined sleeving passage is larger than the part to be welded accommodated therein venting the chamber to atmosphere through inclined sleeving said passage.

7. A mold as set forth in claim 1 including a recess accommodating an object exposed to said weld chamber whereby a part introduced through said inclined sleeving passage may be welded to said object.

8. A mold assembly for welding cable comprising two refractory blocks each having faces mating with the other at an abutting parting plane, recesses formed in said faces forming a weld chamber, and at least one sleeving passage, said sleeving passage being inclined so that its lower end enters the weld chamber and its upper end as it exits the mold assembly is entirely above the weld chamber.

9. A mold assembly as set forth in claim 8 wherein said inclined sleeving passage is formed entirely by the two blocks.

* * * * *